United States Patent
Kunze et al.

(10) Patent No.: US 12,331,187 B2
(45) Date of Patent: Jun. 17, 2025

(54) AQUEOUS RESIN DISPERSION AND AQUEOUS COATING COMPOSITION CONTAINING SAID RESIN DISPERSION

(71) Applicant: BASF Coatings GmbH, Münster (DE)

(72) Inventors: Andreas Arrian Kunze, Muenster (DE); Sibylle Schoeps, Muenster (DE); Rene Hamsen, Muenster (DE); Dirk Benning, Muenster (DE); Hildegund Diekmann, Drensteinfurt (DE); Martin Geuting, Muenster (DE); Silke Przybilla, Muenster (DE); Joerg Ressel, Muenster (DE); Ignacia Rump, Muenster (DE); Dagmar Schemschat, Senden (DE); Hubert Theil, Shanghai (CN); Anna Kondrat, Muenster (DE); Beate Rohkamp, Muenster (DE); Monika Tiggemann, Drensteinfurt (DE); Thorsten Winkler, Muenster (DE); Egbert Nienhaus, Muenster (DE); Sven Gosheger, Drensteinfurt (DE)

(73) Assignee: BASF COATINGS GMBH, Muenster (DE)

( * ) Notice: Subject to any disclaimer, the term of this patent is extended or adjusted under 35 U.S.C. 154(b) by 666 days.

(21) Appl. No.: 17/612,707

(22) PCT Filed: Apr. 23, 2020

(86) PCT No.: PCT/EP2020/061370
§ 371 (c)(1),
(2) Date: Nov. 19, 2021

(87) PCT Pub. No.: WO2020/233939
PCT Pub. Date: Nov. 26, 2020

(65) Prior Publication Data
US 2022/0220298 A1    Jul. 14, 2022

(30) Foreign Application Priority Data
May 23, 2019   (EP) .................................. 19176217

(51) Int. Cl.
C08L 63/00    (2006.01)
C08G 59/10    (2006.01)
C08G 59/18    (2006.01)
C08G 59/24    (2006.01)
C08G 59/40    (2006.01)
C08G 59/50    (2006.01)
C09D 163/00   (2006.01)

(52) U.S. Cl.
CPC .............. *C08L 63/00* (2013.01); *C08G 59/10* (2013.01); *C08G 59/245* (2013.01); *C08G 59/5026* (2013.01); *C08G 59/5033* (2013.01); *C09D 163/00* (2013.01); *C08L 2201/50* (2013.01)

(58) Field of Classification Search
None
See application file for complete search history.

(56) References Cited

U.S. PATENT DOCUMENTS

| | | | |
|---|---|---|---|
| 5,032,629 A | 7/1991 | Hansen et al. | |
| 5,539,023 A | 7/1996 | Dreischhoff et al. | |
| 5,847,027 A | 12/1998 | Marten et al. | |
| 5,906,864 A | 5/1999 | Osterhold et al. | |
| 5,959,061 A | 9/1999 | Neumann et al. | |
| 6,008,314 A | 12/1999 | Collong et al. | |
| 6,432,485 B1 | 8/2002 | Beyers et al. | |
| 2003/0001135 A1 | 1/2003 | Gerlitz et al. | |
| 2003/0125502 A1 | 7/2003 | Feola et al. | |
| 2004/0176502 A1* | 9/2004 | Raymond | C04B 41/009 523/416 |

FOREIGN PATENT DOCUMENTS

| | | |
|---|---|---|
| DE | 4303562 A1 | 8/1994 |
| DE | 19843835 A1 | 3/2000 |
| EP | 0387418 A2 | 9/1990 |
| EP | 0610787 A2 | 8/1994 |
| EP | 0735070 A1 | 10/1996 |
| EP | 0816453 A2 | 1/1998 |
| EP | 0821021 A1 | 1/1998 |
| EP | 1266920 A2 | 12/2002 |
| EP | 1316574 A1 | 6/2003 |
| WO | 9749749 A1 | 12/1997 |

OTHER PUBLICATIONS

International Search Report for corresponding PCT/EP2020/061370 mailed Jul. 2, 2020, 4 Pages.
European Search Report for EP Patent Application No. 19176217.8, Issued on Oct. 11, 2019, 5 pages.

* cited by examiner

*Primary Examiner* — Ha S Nguyen
(74) *Attorney, Agent, or Firm* — Armstrong Teasdale LLP

(57) ABSTRACT

Described herein is an aqueous resin dispersion (AD) including a resin component (R) including at least one di- and/or polyfunctional monomeric primary and/or secondary amine (M) and polyfunctional polymeric organic amines having primary and/or secondary amino groups. Also described herein is an aqueous two-component coating composition including the resin dispersion.

17 Claims, No Drawings

AQUEOUS RESIN DISPERSION AND AQUEOUS COATING COMPOSITION CONTAINING SAID RESIN DISPERSION

CROSS-REFERENCE TO RELATED APPLICATIONS

This application is a U.S. National Phase Application of International Patent Application No. PCT/EP2020/061370, filed Apr. 23, 2020, which claims priority to European Patent Application No. 19176217.8 filed May 23, 2019, the entire contents of which are hereby incorporated by reference herein.

The present invention relates to an aqueous resin dispersion, i.e. an aqueous resin dispersion (AD) comprising a resin component (R), where the resin component comprises di- and/or polyfunctional monomeric organic amines and polyfunctional polymeric organic amines. The present invention also relates to aqueous coating compositions comprising the resin dispersion (AD). The coating composition comprises a combination of the resin dispersion and an epoxy resin and is of excellent suitability as aqueous sanding surfacer or primer-surfacer. Accordingly, by application to a substrate and subsequent curing of the coating composition, it is possible to obtain a surfacer layer having excellent sandability and hence usability in the repair sector in particular.

STATE OF THE ART

Aqueous surfacers and primer-surfacers that are curable on the basis of epoxy-amine combinations and are able in this way to form corrosion-stable surfacer layers or primer-surfacer layers are known in principle. Their profile of properties is quite complex and has the particular features of the corrosion stability already mentioned and good adhesion to various substrates such as steel, galvanized steel, aluminum, electrocoats and old paint systems.

However, it should be noted that surfacer layers in particular that are constructed in the automotive refinishing sector should have acceptable sandability even after curing at moderate temperature and within processing times customary in paint shops. This sandability is of high importance in the painting procedure in order to create a homogeneous surface for the layers that then follow, such as basecoat and clearcoat, and ultimately to enable an esthetically high-quality appearance of the painted surface. However, the systems known from the prior art still have shortcomings specifically with regard to sandability.

WO 97/49749 A1 discloses coating compositions based on aqueous epoxy systems comprising particular epoxy-aminourethane adducts as curing agent. These are obtained by reacting very specific aminourethane compounds with epoxy compounds. The epoxy compounds are obtained by reacting polyalkylene polyethers with one or more amino groups. These adducts are used in aqueous two-component paints, especially automotive paints. The paints or paint coats produced therefrom have good sandability. It is stated that the paints described in EP 0 387 418 A2 have disadvantages with regard to their sandability.

EP 0 387 418 A2 discloses a curing agent for epoxy compounds and the use thereof for production of coatings and coverings. The curing agent is prepared by reacting polyalkylenepolyetheramines with a stoichiometric excess of di- and/or polyepoxy compounds and then reacting the aforementioned adduct with a stoichiometric excess of amines. The coating compositions produced with these curing agents have good storage stability and good curing properties. There is no mention of refinishing, nor of the sandability of coatings or the use of the curing agents in surfacers.

EP 0 610 787 A2 describes a curing agent for aqueous epoxy resin dispersions, obtained by reacting an adduct (A) formed from polyepoxide and polyalkylenepolyether polyol with a reaction product of an amine and an epoxide or of an amine and subsequent reaction with an epoxide, where the amine is used in a stoichiometric excess in each case. The problem addressed is, for example, that of obtaining good bonding and hardness in coating compositions including surfacers.

PROBLEM AND TECHNICAL SOLUTION

The problem addressed by the present invention was accordingly that of eliminating the disadvantages of the prior art and providing an aqueous coating composition which, after application and curing, especially in the context of automotive refinishing, has good bonding and anticorrosive properties, but nevertheless has very good sandability even after comparatively brief curing at low temperatures. The composition was thus to have particularly good suitability as surfacer and primer-surfacer or for production of the surfacer layer in a multicoat paint system.

It has been found that the stated objects are achieved by a novel aqueous resin dispersion (AD) comprising a resin component (R) comprising at least one di- and/or polyfunctional monomeric primary and/or secondary amine (M) and polyfunctional polymeric organic amines having primary and/or secondary amino groups, wherein the resin component (R) has an NH equivalent of 150 to 400 g/mol and a proportion by weight of di- and/or polyfunctional monomeric organic amines (M) of 5% to 15% by weight, wherein the polyfunctional polymeric organic amines having primary and secondary amino groups also comprise, in interreacted form, (i) at least one di- and/or multifunctional organic epoxy compound, where the epoxy compounds have an average epoxy equivalent weight of less than 400 g/mol,
(ii) at least one monomeric amine (M), and
(iii) at least one compound X—R where X is a functional group reactive toward epoxy groups and R is an organic radical containing polyoxyalkylene units and not containing any further X groups, and wherein the amines (M) consist to an extent of at least 65 mol % of amines consisting of amino groups and hydrocarbon units.

The novel resin dispersion (AD) is also called dispersion of the invention. The present invention further provides an aqueous two-component (2K) coating composition comprising the dispersion of the invention. The present invention additionally provides a process for producing a coating using the coating composition. What is not least provided by the present invention is a process for repairing a multicoat paint system having defects, comprising the application of such a coating composition, the curing of the composition to produce a cured coating layer and the subsequent sanding of the coating layer. Also provided by the present invention are a coating layer produced as described and a coated substrate.

DETAILED DESCRIPTION

Aqueous Resin Dispersion (AD)

The present invention firstly relates to an aqueous resin dispersion (AD) comprising a resin component (R).

The term "aqueous" in connection with dispersions such as resin dispersions, phases or else aqueous coating compositions is known in principle. What is meant is a dispersion or mixture containing a significant proportion of water as solvent. It will be appreciated that it is alternatively possible for aqueous systems to contain organic solvents in at least minor amounts, for example as cosolvents with an emulsifier function for stabilization of particular constituents such as resins, pigments or additives. "Aqueous" in the context of the present invention should preferably be understood to mean that the system in question, preferably the dispersion, has a proportion of at least 40% by weight, preferably at least 50% by weight, even more preferably at least 60% by weight, of water, based in each case on the total amount of the solvents present (i.e. water and organic solvents). Preferably in turn, the proportion of water is 50% to 99% by weight, especially 60% to 98% by weight, based in each case on the total amount of the solvents present.

Resin or resin component is likewise understood to mean, in accordance with the definition known in principle, a product that contains organic constituents, namely organic reaction products, oligomers and/or polymers, and if appropriate, like the resin component (R), monomers as well. Resins have a more or less broad distribution of molar masses and are generally usable as binders in coating compositions. They thus form at least a proportion of the polymeric network of a coating layer present after curing.

According to the invention, the resin component (R) contains at least one di- and/or polyfunctional monomeric primary and/or secondary amine (M), i.e. at least one monomeric amine comprising at least two amino groups selected from the group of the primary and secondary amino groups. It is of course not impossible for tertiary amino groups additionally to be present.

In the context of the present invention, it is essential that the amines (M) used overall and hence present in the aqueous dispersion (AD) consist at least to an extent of 65 mol % of amines consisting of amino groups and hydrocarbon units. It has been found that, otherwise, the result is an adverse effect on sandability. What this means is thus that other functional groups in particular, for example hydroxyl, carboxyl or nitrile groups, are present only in minor amounts. It is preferable that the amines (M) consist to an extent of at least 75 mol %, more preferably to an extent of at least 90 mol %, of amines consisting of amino groups and hydrocarbon units. Most preferably, the proportion of these amines is 100 mol %.

The proportion of corresponding amines is basically self-explanatory from the amounts of the amines used. In the case of use of products such as commercial products, however, it is equally possible by analysis of the products (in which amines may also already be partly or entirely covalently bonded to one another) to determine the proportion of corresponding amines to such an extent that it is directly clear that the abovementioned conditions are fulfilled (analysis, for example, via gas chromatography (GC), mass spectrometry (MS)).

Examples of suitable amines (M) are the monomeric aliphatic amines, aromatic amines and araliphatic (mixed aliphatic-aromatic) amines that are known in principle to the person skilled in the art.

Examples of di- and/or polyfunctional monomeric primary and/or secondary amines include the following: ethylenediamine, propylene-1,2-diamine, propylene-1,3-diamine, butane-1,4-diamine, octane-1,8-diamine, 1,3-diaminopentane, hexamethylenediamine, 2-methylpentamethylenediamine, neopentanediamine, cyclohexanediamine, 2,2,4-(2,4,4-)trimethylhexamethylenediamine, isophoronediamine, bis(aminomethyl)cyclohexane, bis(4-aminocyclohexyl)methane, diethylenetriamine, triethylenetetramine, tetraethylenepentamine, dipropylenetriamine, bis(hexamethylenediamine), N,N-dimethylaminodipropylenetriamine, laurylpropylenediamine, 1,2- and 1,3-(m)-xylylenediamine and 1,4-bis(aminomethyl)benzene. Further amines include aminoethylethanolamine or else heterocyclic polyamines such as aminoethylpiperazine and bis(aminopropyl)piperazine.

Preference is given to difunctional primary and/or secondary amines (M), and preference again to difunctional primary amines. Very particular preference is given to isophoronediamine and m-xylylenediamine, and the resin component more preferably contains a mixture of the two diamines mentioned. What is meant is thus that the amines (M) are a mixture of isophoronediamine and m-xylylenediamine.

The proportion of the at least one di- and/or polyfunctional monomeric primary and/or secondary amine (M), based on the resin component (R) is 5% to 15% by weight, preferably 6% to 14% by weight, more preferably 7% to 13% by weight (for test method see examples section).

The resin component (R) also contains polyfunctional polymeric organic amines having primary and/or secondary amino groups. By delimitation from the monomeric amines already described, these are thus specifically not low molecular weight compounds having a discrete number of amino groups per molecule which is constant for each molecule, but are adducts or reaction products that have polymeric character and wherein the number of amino groups per molecule can be described solely by way of averages.

The structure of the components described here, namely that of the polyfunctional polymeric organic amines having primary and/or secondary amino groups, can be inferred from the starting compounds described further down for preparation of the resin component (R).

The resin component (R) has an N—H equivalent of 150 to 400 g/mol, preferably 160 to 350 g/mol, more preferably 170 to 250 g/mol (for method of determination see examples section).

The aqueous dispersion (AD) comprising the resin component (R) is preparable, for example, by a two-stage process (A+B), which will be described in detail hereinafter.

Stage A

In a first stage (A) of the reaction sequence, two starting components (Ia) and (Ib) are reacted with one another, namely an epoxy-functional resin mixture (Ia) and a component (Ib) containing at least one di- and/or multifunctional monomeric primary and/or secondary amine (M). This gives rise to an amino-functional resin mixture (I). It is accordingly apparent that the amounts of components (Ia) and (Ib) are matched to one another such that the N—H equivalents of component (Ib) are in a molar excess relative to the epoxy groups of component (Ia).

The epoxy-functional resin mixture (Ia) contains, in inter-reacted form, two components (Ia1) and (Ia2) that are described hereinafter. The resin mixture (Ia) preferably consists of these two components, i.e. is prepared by reaction solely of these two components.

Component (Ia1) is at least one di- and/or multifunctional organic epoxy compound.

Useful components (Ia1) are accordingly the epoxy resins known in principle. It is preferable that these epoxy compounds used have an average epoxy equivalent weight of less than 400 g/mol. It has been found that a correspondingly low average epoxy equivalent weight and hence a higher epoxy functionality of this component leads to better sandability again in the surfacer layer to be ultimately produced. More preferably, the average epoxy equivalent weight is less than 350 g/mol, preferably less than 300 g/mol, more preferably less than 250 g/mol. The average epoxy equivalent can be obtained via the determination of the epoxy equivalent of all epoxy compounds used (for test method see examples section) and weighting of the proportions by mass thereof in the total weight of the epoxy compounds. It is likewise possible, when using existing products such as commercial products (in which the epoxy compounds may already be covalently bonded), by analysis of the products, to determine the average epoxy equivalent weight to the extent that it is immediately clear that it is below the abovementioned upper limits (analysis, for example, via gas chromatography (GC), mass spectrometry (MS)).

Epoxy resins are known to be polycondensation resins containing more than one epoxy group on statistical average in the base molecule. For example, these are epoxy resins prepared by condensation of bisphenol A or bisphenol F with epichlorohydrin. These compounds contain hydroxyl groups along the chain and epoxy groups at the ends. According to the chain length of the epoxy resins, there is a change in the crosslinking capacity via the epoxy groups since precisely that crosslinking capacity via the epoxy groups falls with rising chain length/molar mass. In the context of the present invention, it is ultimately possible to use any epoxy resins known per se to the person skilled in the art, provided that they are within the abovementioned epoxy equivalent weight range. For example, it is possible to use the commercially available epoxy resins that are mentioned further down, which can be obtained as a solution or dispersion in organic solvents or water.

Such epoxy resins can be obtained, for example, as 100% systems or else solutions or dispersions in organic solvents or water.

It is preferable that component (Ia1) is an epoxy compound which is difunctional on average, since this is what forms via epichlorohydrin in the abovementioned standard synthesis.

It is additionally preferable that the epoxy compound (Ia1) is a bisphenol A-based epoxy compound, i.e. an epoxy compound that has been prepared via the use of bisphenol A. What this also means is more particularly that the epoxy compound does not contain any bisphenol F introduced via the synthesis. It has been found that the result of this in turn is a positive influence on the sandability of the surfacer layer to be ultimately produced.

Component (Ia2) is at least one compound X—R where X is a functional group reactive toward epoxy groups and R is an organic radical containing polyoxyalkylene units and not containing any further X groups. Preference is given to using exactly one compound X—R as component (Ia2).

The X groups are the groups known to those skilled in the art, for example primary or secondary amino groups, hydroxyl groups, carboxyl groups or thiol groups.

It is crucial that the compound X—R has just one X group. Otherwise, an adverse effect is found on the sandability of the surfacer layer to be ultimately produced.

Preferred X groups are amino groups, and among those preferably primary amino groups. Aside from the good reactivity of amino groups with epoxy groups, the primary amine has two N—H equivalents and hence linkage sites to epoxides. In this way, incorporation of the compound X—R into a side chain position of the molecule can take place. The overall result of this in turn is advantages for the sandability of the surfacer layer.

The R group is an organic radical containing polyoxyalkylene units, especially preferably polyethylene or polypropylene units or mixed polyethylene/polypropylene units. It is preferable that the organic R radical, apart from any molecular units resulting from the synthesis, consists of polyoxyalkylene units. For the sake of simplicity, such R groups are also referred to as polyoxyalkylene groups. Molecular units that result from the synthesis are, for example, organic radicals of molecules that are used at the start of the formation of a polyoxyalkylene chain, for example a starter alcohol by means of which the polymerization of ethylene oxide and/or propylene oxide is initiated. Preferably, the R group is a polyethylene group, a polypropylene group or a mixed polyethylene/polypropylene group.

The weight-average molecular weight of the compound (Ia2) may vary widely and is, for example, in the range from 800 to 2200 g/mol (determined by means of coupling of size exclusion chromatography with light scattering).

The compounds X—R mentioned may be prepared themselves or else obtained commercially. For example, the obviously preferred polyoxyalkylenemonoamines can be purchased from Huntsman under the "Jeffamine" name.

The epoxy-functional resin mixture (Ia) contains, in interreacted form, the two components (Ia1) and (Ia2). Accordingly, the epoxy groups of component (Ia1) and the X groups of component (Ia2) are thus reacted with one another. Corresponding reaction regimes and conditions are known to those skilled in the art and do not require any further mention.

Component (Ia) is an epoxy-functional resin mixture. It is thus apparent from the feedstocks described that components (Ia1) and (Ia2) are used in such a way that the epoxy groups of component (Ia1) are in a molar stoichiometric excess relative to the reactive units of the X groups. The number of reactive units means the number of potential linkage sites for each epoxy group. For a hydroxyl group or secondary amino group, there is, for example, one reactive unit per X group. For primary amino groups, there are two reactive units (two N—H functions). Preferably, the molar ratio of the epoxy groups of compound (Ia1) and the epoxy-reactive units of the X groups of component (Ia2) is from 10 to 1.1, more preferably 5 to 1.5, especially preferably from 3.5 to 1.8.

The amount of epoxy groups in component (Ia1) can be obtained or adjusted appropriately to the purpose in a known manner by determining the epoxy equivalent weight. The amount of reactive units in the X groups is found from the test methods known per se for determining the amount of functional groups X, for example by the determination of the amine number, the OH number or acid number (DIN 53176: 2002-11, DIN 53240-3:2016-03, DIN EN ISO 2114 Correction 1: 2006-11).

Component (Ia) preferably has an epoxy equivalent weight of 500 to 1500 g/mol, more preferably 600 to 1200 g/mol.

Component (Ib) to be reacted with component (Ia) comprises at least one di- and/or multifunctional monomeric primary and/or secondary amine (M). Preferably, component (Ib) consists of at least one such amine (M).

Examples of suitable amines (M) have already been described above as a constituent of the resin component (R). All the remarks made there and also preferred variants are correspondingly applicable to the amines in component (Ib). The resin mixture (I) is an amino-functional resin mixture, the preparation of which thus requires, in relation to the functional groups of components (Ia) and (Ib) to be reacted with one another, a molar excess of the N—H equivalents. Specifically, the NH equivalent of the resin mixture (I) is from 50 to 140 g/mol, preferably 70 to 130 g/mol (for method of determination see examples section). Moreover, the resin mixture (I) comprises a proportion of 17.5% to 40% by weight, preferably 25% to 35% by weight, of di- and/or polyfunctional monomeric primary and/or secondary amines (M), i.e. component (Ib). Both criteria can be adjusted by the person skilled in the art by suitable choice of the molar amounts of the two components and in the knowledge that there is quantitative conversion of epoxy groups and N—H functions under the conditions and reaction regimes that are known per se. In addition, the examples below give a more specific overview again. Possible reaction regimes and corresponding conditions are known to those skilled in the art and do not require any further mention. Preferably, the resin mixture (I), after its production, is in dispersion in water and in that case is in aqueous dispersion.

The resin mixture (I) can as such be produced as described above and hence obtained in aqueous dispersion. It is likewise possible to commercially purchase an aqueous dispersion of a resin mixture (I) (for example as Beckopox VEH 2849w/80WA (from Allnex)).

Stage B

In a second stage (B) of the reaction sequence, two starting components (IIa) and (IIb) are reacted with one another in the aqueous phase, namely a component (IIa) containing the amino-functional resin mixture (I) and a component (IIb) containing at least one di- and/or multifunctional organic epoxy compound having an average epoxy equivalent weight of less than 400 g/mol, preferably less than 350 g/mol, more preferably less than 250 g/mol. Optionally after removal of organic solvents used, this gives rise to the aqueous dispersion (AD) comprising a resin component (R). It is apparent from the properties of the resin component (R) that have already been mentioned in detail above that the amounts of components (IIa) and (IIb) are matched to one another such that the N—H equivalents of component (IIa) are in a molar excess relative to the epoxy groups of component (IIb).

Preference is given to using, as component (IIa), the direct reaction product from stage (A) that has been supplemented merely optionally with solvents or auxiliaries such as emulsifiers. This is because the resin mixture (I) is obtained as an aqueous dispersion after stage (A) and can thus be used directly in stage (B) that takes place in the aqueous phase. Component (IIa) preferably does not contain any further constituents that can be reacted with component (IIb) aside from the reaction product mentioned. Component (IIb) preferably consists of at least one, preferably exactly one, di- and/or multifunctional organic epoxy compound having an epoxy equivalent weight that meets the abovementioned prerequisites. Examples of suitable epoxy compounds are those already described above as component (Ia1). All the remarks made there and also preferred variants are correspondingly applicable to the epoxy compounds in component (IIb).

The aqueous dispersion (AD) has, for example, a solids content of 25% to 45% by weight (for test method see examples section).

The above-described process is a preferred process variant that also permits, for example, the utilization of existing commercial products (for example the above-described Beckopox VEH 2849w/80WA). For instance, the inventive dispersion (AD), in the case of use of the aforementioned commercial product, is obtainable by simple modification with an appropriate epoxide (since, apart from this last reaction, all further reaction processes have already been implemented in the production of the commercial product). It will be appreciated, however, that it is also possible to choose another form of provision of the dispersion (AD) and hence of the resin component (R) present therein. It is thus possible, for example by adjusting appropriate stoichiometries of amines and epoxides, to achieve provision in a one-stage process in which all starting components are reacted together. It would also be possible first to react the components referred to above as components (Ia1) and (Ia2) with one another, and then to arrive at the dispersion (AD) or the resin component (R) by simultaneous reaction of this intermediate with further epoxides and monomeric amines (M).

It is preferable that the resin component (R) consists of the at least one di- and/or polyfunctional monomeric primary and/or secondary amine (M) and the polyfunctional polymeric organic amines with primary and/or secondary amino groups.

It is likewise preferable that the polyfunctional polymeric organic amines having primary and secondary amino groups consist of the aforementioned starting materials, in reacted form. Accordingly, the polyamines preferably consist of
(i) at least one di- and/or multifunctional organic epoxy compound, where the epoxy compounds have an average epoxy equivalent weight of less than 400 g/mol,
(ii) at least one monomeric amine (M), where the amines (M) consist to an extent of at least 65 mol % of amines consisting of amino groups and hydrocarbon units, and
(iii) at least one compound X—R where X is a functional group reactive toward epoxy groups and R is an organic radical containing polyoxyalkylene units and not containing any further X groups.

The amounts and ratios of the individual starting components can of course be adjusted without difficulty by the person skilled in the art. They are in any case to be chosen, within a certain freedom of configuration, so as to give an NH equivalent to be achieved in accordance with the invention and also a proportion of monomeric amines (M) to be achieved in accordance with the invention.

It follows from the above that component (i) is equivalent to component (IIb) described above in the preferred process, preferably to component (Ia1) and component (IIb), component (ii) is equivalent to component (Ib), and component (iii) is equivalent to component (Ia2). The preferred executions described within the scope of the process are of course also applicable within the scope of components (i), (ii) and (iii).

Aqueous Two-Component (2K) Coating Composition

The present invention also relates not least to an aqueous 2K coating composition comprising the aqueous dispersion (AD).

As is known, such a 2K composition means that a component (1) as defined in more detail further down (paint base component) and a component (2) as defined below (curing component) are prepared and stored separately from one another and are not combined until shortly before application. The processing time or pot life (i.e. the time within which the coating composition can be processed at room temperature (15 to 25° C., especially 20° C.) without the increase in viscosity, as a result of corresponding crosslinking reactions at room temperature, for example, being so severe that application is no longer possible) is dependent, as is known, on the constituents used in components (1) and (2). In the context of the present invention, the processing time of the coating composition is preferably at least 2 min up to 60 min, more preferably at least 5 min to 60 min. The particular advantage of such a two-component coating composition is that, in particular, no high temperatures are needed for curing. Preference is given to curing the coating composition of the invention after application to a substrate at not more than 80° C., especially preferably not more than 65° C.

Curing means the process known to the skilled person, in other words the conversion of a coating composition, applied as a film to a substrate, into the ready-to-use state, in other words, therefore, into a state in which the substrate provided with the coating in question can be put to its intended use. In connection with the central problem addressed in the context of the present invention, namely the obtaining of good sandability, exactly that sandability and subsequent overcoatability are of course criteria for intended use. The curing is especially effected by chemical reaction of reactive functional groups of binder constituents present in the different components (1) and (2) of the coating composition. Particular mention should thus be made in the context of the present invention of the reaction of the amino groups or N—H functions of the resin component (R) and the epoxy groups of at least one further resin component present in that case in the respective other main component (paint base components or curing component) of the 2K coating composition. As a result of these crosslinking reactions and of the parallel evaporation of any organic solvents and/or water present, a coating film is formed—that is, a cured coating layer (cured coating) is produced. Activation of the reactions is possible by means of thermal energy, although in the case of the present invention there is the above-described advantage of high temperatures not being necessary.

The term "binder" or "binder constituent" refers herein, in accordance with the relevant DIN EN ISO 4618, to the nonvolatile fraction of a coating material, excluding pigments and fillers. Specific binder constituents in this context are thus, as well as the resin component (R), also the other resin component already mentioned above that contains functional groups for crosslinking with N—H functions or else coatings additives.

Merely for the sake of clarity, however, the term "binder" is used mainly in relation to the resin components of the paint base component (1) that are primarily responsible for film formation, whereas the resin component present in the curing component (2) is referred to primarily as curing agent or else crosslinking agent. It is regularly the paint base component (1) that contains, as well as the binder and solvents, all or the vast majority of further functional constituents of the composition, for example pigments, fillers and additives, whereas the curing component (2), aside from solvents and any additives present, contains solely the resin component intended for crosslinking. The terms "paint base component" and "curing component" in connection with 2K coating compositions are known to the person skilled in the art and also have essence-characterizing and hence delimiting character within a certain scope of configuration.

Of course, for completion of a 2K coating composition, there may also be at least one further additional main component. This means that, as well as the paint base component (1) and the curing component (2), further constituents such as solvents or additives may be added in at least one further main component, for example after the two main components (1) and (2) have been added. However, the composition is nevertheless by definition a 2K coating composition since the number of components containing the constituents to be crosslinked with one another that are responsible for the film formation is two.

The 2K coating composition is of excellent suitability as surfacer and primer-surfacer and usable as such. Accordingly, the 2K coating composition is preferably a surfacer or primer-surfacer. The function, configuration and field of use of surfacers and primer-surfacers are known in principle to the person skilled in the art and in that respect have delimiting character. A surfacer is generally applied in the context of automotive OEM finishing as an interlayer (to the previously cured electrocoat), cured separately and then overcoated with basecoat and clearcoat. Primer-surfacers find use especially in the automotive refinishing sector, where they are responsible for filling locally damaged areas in the original paint system and for obtaining appropriate adhesion on the substrate and assurance of corrosion protection.

The 2K coating composition contains, as an obligatory constituent, an aqueous dispersion (AD) comprising a resin component (R). The amount of the dispersion (AD) here is preferably chosen such that the proportion of the resin component (R), based on the solids content of the coating composition, is 10-30% by weight, more preferably 15-25% by weight.

The 2K coating composition also contains at least one further resin component containing epoxy groups. The epoxy groups can react with the N—H functions to form network structures and in this way contribute to curing of a coating layer produced from the coating composition. Corresponding epoxy resins are known and are also described further up in connection with components (Ia1) and (IIb). Preferred epoxy resins have an epoxy equivalent weight of less than 400 g/mol, preferably 100 to less than 400 g/mol, more preferably 150 to 300 g/mol.

The proportion of the further resin component, based on the solids content of the coating composition, is, for example, 15-40% by weight, more preferably 20-30% by weight.

Preferably, the molar ratio of the N—H functions of the resin component (I) and the epoxy groups of the further resin component is between 0.7:1 and 0.95:1, for example 0.9:1.

It follows directly from the above statements that the aqueous dispersion (AD) comprising a resin component (R) and the at least one further resin component having epoxy groups are present in different main components of the components that are present in any case in the composition (paint base component (1) and curing component (2)).

The 2K coating composition is aqueous, i.e. contains at least water as solvent. An exact definition of "aqueous" can already be found further up.

The 2K coating composition preferably comprises further constituents, especially those that lead to suitability as surfacer or primer-surfacer. Particular mention should be made in this connection of pigments and fillers.

Preferred pigments are black and/or white pigments. The primer thus preferably contains at least one black pigment or at least one white pigment or at least one white pigment and one black pigment. This means that the primer of the invention preferably has a black, white or (in various gradations) gray color. It is of course not impossible for further pigments to be present as well.

Preferred black pigments are the typical organic and inorganic, especially inorganic, black pigments as commercially available in powder form. Particular mention should be made of pigment blacks (carbon blacks), iron oxide ($Fe_3O_4$) pigments such as the typical synthetic iron oxides (available, for example, under the Bayferrox trade name from Lanxess), mixed oxide pigments such as manganese black or spinel black. Very particular preference is given to pigment blacks (carbon blacks) and iron oxide pigments.

Preferred white pigments are the typical inorganic white pigments, for example titanium dioxide (for example the rutile pigments known by the Kronos trade name from Kronos), zinc oxide, zinc sulfide or antimony trioxide. Very particular preference is given to titanium dioxide, especially in its rutile modification.

Further preferred pigments are the pigments known by the umbrella term "anticorrosion pigments". Particular preference is given here to zinc phosphate. Even though zinc phosphate has a white color, it is not classified as a white pigment but as an anticorrosion pigment owing to its anticorrosive effect.

The proportion of the pigments is preferably 15-25% by weight, especially 20% by weight, based in each case on the solids content of the coating composition.

Fillers present with preference are all inorganic and organic fillers that are known per se and familiar to the person skilled in the art, preferably inorganic fillers. The fillers thus especially include the substances known to those skilled in the art that are used, for example, in granular form or in powder form for attainment of particular physical properties of coating compositions and are insoluble in the respective use medium. These especially include carbonates such as calcium carbonate or barium carbonate, sulfates such as calcium sulfate and barium sulfate, silicates and sheet silicates such as talc, pyrophyllite, mica, kaolin, precipitated calcium silicates, aluminum silicates, calcium/aluminum silicates, sodium/aluminum silicates and mullite, silicas such as quartz, cristobalite, precipitated silicas or especially fumed silicas as obtainable, for example, under the Aerosil trade name (from Evonik), metal oxides and hydroxides, for example aluminum hydroxide and magnesium hydroxide.

The proportion of the fillers is preferably 30-50% by weight, especially 30-40% by weight, based in each case on the solids content of the coating composition.

In addition, the coating composition may also comprise at least one additive. Examples of such additives are light stabilizers, antioxidants, deaerating agents, emulsifiers, slip additives, polymerization inhibitors, adhesion promoters, leveling agents, film-forming auxiliaries, thickeners, sag control agents (SCAs) or corrosion inhibitors. They are used in the customary and known amounts. The same applies to the possible use of organic solvents, but the amount thereof is chosen such that they do not alter the aqueous character of the coating composition.

The solids content of the 2K coating composition may vary according to the requirements of the individual case, but is preferably in the region of 70-85% by weight.

The solids content is guided primarily by the viscosity required for application, more particularly for spray application, and so may be adjusted by the skilled person on the basis of his or her general art knowledge, optionally with assistance from a few exploratory tests.

The 2K coating composition can be produced using the mixing methods and mixing units that are customary and known for the production of coating compositions, such as stirred tanks, stirred mills, extruders, kneaders, Ultraturrax, in-line dissolvers, static mixers, toothed ring dispersers, expansion nozzles and/or microfluidizers. It should of course be noted that component (1) (paint base component) and component (2) (curing component) are produced and stored separately from one another and, as described above, are combined and mixed only briefly prior to application of the coating composition to a substrate.

The present invention further provides a process for producing a coating on a substrate, in which the coating composition of the invention is applied to a substrate and then a coating film is formed. It will be appreciated that, in the context of the process of the invention in which the coating composition is used, the above-described particular and preferred embodiments with regard to the coating composition are likewise applicable.

The application of the coating composition of the invention to a substrate can especially be effected in the layer thicknesses that are customary in the vehicle industry in the range, for example, from 5 to 200 micrometers, preferably 10 to 150 micrometers, more preferably 30 to 70 micrometers. The stated layer thicknesses should be regarded as dry film layer thicknesses after the curing described below. For example, the known methods are employed here, such as spraying, knife-coating, painting, pouring, dipping, impregnating, trickling or rolling. Preference is given to employing spraying methods. After the composition of the invention has been applied, a polymer film or cured coating film is formed therefrom. The composition applied is thus cured by known methods. The curing is effected at temperatures of, for example, 15 to 120° C., especially 20 to 80° C., most preferably of 20 to 65° C. These preferred comparatively low curing temperatures result particularly from the fact that the coating composition is a (2K) coating composition, in the case of which, in particular, only low curing temperatures are needed for the thermal crosslinking. The duration of the curing may vary significantly in the individual case and is, for example, between 5 min and 16 hours, preferably 20 min to 80 min. These preferred comparatively short curing times result particularly from the fact that the composition of the invention requires only comparatively short curing times at temperatures that are nevertheless comparatively low in order nevertheless to have sufficient hardness that enables the sanding of the cured coating. A curing operation which is very particularly preferred in this respect is effected at 40 to 65° C. for 20 to 80 minutes.

The curing in the individual case may optionally be preceded by flashing-off, for example at room temperature (about 15 and 25° C.) for, for example, 1 to 60 min. Flash-off in the context of the present invention means evaporation of organic solvents and/or water, as a result of which the paint dries but does not yet cure, and more particularly does not yet form a fully crosslinked coating film.

The curing then affords the coated substrate of the invention, which likewise forms part of the subject matter of the present invention. The present invention also provides a coating produced from the composition.

Substrates used are, for example, metallic substrates, preferably those as used within the automotive industry (vehicle manufacture). Advantageously, unalloyed and alloyed steels and/or iron, zinc and aluminum substrates and corresponding alloys are used.

If it is stated above that the composition is applied to a substrate, this of course, however, does not mean that the composition must be applied directly to a metallic substrate. Instead, there may be at least one further layer between the metallic substrate and the layer formed by the composition. This is the case, for example, when the coating composition is used as surfacer in OEM finishing. This is because, in such a case, there will be at least one electrocoat layer between the surfacer layer and the metallic substrate. In other words, the substrate to which the composition of the invention is applied is thus a metal substrate coated with an electrocoat layer.

As already indicated above, the coating composition of the invention, however, is particularly advantageously usable as primer-surfacer in the refinishing sector, especially automotive refinishing, and in that case has properties such as good adhesion, corrosion protection and sandability after only brief curing at moderate temperatures.

Accordingly, in particular embodiments of the present invention, the substrates are already fully painted metallic substrates, especially those painted with multicoat automotive paint systems, in which the respective multiple coating has local damage (defects). More particularly, these are thus automotive bodywork or parts thereof that have damage, for example stonechip damage and the like. In the damaged regions, the original multilayer coating has thus been at least partly detached by outside action. The coating composition of the invention is then used in the repair of these damaged areas, i.e. the refinishing, as primer-surfacer. In general, in the refinishing operation, the application of the primer is preceded by cleaning and sanding of the damaged originally coated substrate. This removes any only insufficiently adhering and partly detached areas of the original coating that are present and/or corrosion products that have already formed and especially also locally exposes the metallic substrate. This is thus a complex substrate surface having a wide variety of different interfaces. One interface here is that with the completely exposed metallic substrate. Further interfaces and edges can be found in the region between the damaged, cleaned and sanded sites and the areas surrounding these sites with intact original paint system. At all these interfaces, one and the same coating composition has to assure adequate adhesion. Thus, the composition of the invention offers great advantages since, even in this demanding area, excellent adhesion, corrosion resistance and sandability are nevertheless obtained.

In preferred embodiments of the invention, after the production of a cured coating from the composition of the invention, especially of a surfacer or primer-surfacer layer, further coating compositions are applied and a multicoat paint system is formed. These further coating compositions are especially standard basecoats and clearcoats.

The invention is to be elucidated hereinafter by examples.

EXAMPLES

Methods of Determination
Proportion of Monomeric Amines in Aqueous Dispersions

The determination is effected by gas chromatography to DIN 51 405:

The samples are injected directly into the split injector of a gas chromatograph with a flame ionization detector and separated both on a column with polar phase (polyethylene glycol; 50 m fused silica capillary column with polyethylene glycol phase) and on a nonpolar phase (polydimethylsiloxane; 50 m fused silica capillary column with polydimethylsiloxane phase). Evaluation is effected by the ISTD % method.

About 100-500 mg of sample (according to amine content) are weighed accurately to 0.1 mg into a 5 mL snaplid bottle on an analytical balance. About 5% ISTD diethylene glycol dimethyl ether are weighed accurately to 0.1 mg into the sample. The samples are diluted with 5 mL of THF. (Should the sample not dissolve in THF, a suitable solvent has to be found by experiments.)

The sample thus prepared is analyzed on an Agilent 7890 gas chromatograph. Injection is effected by means of an automatic sampler.

Gas Chromatography Conditions:
Oven program: 40° C. (hold time 5 min) (3°/min)→100° C. (10°/min)→230° C. (hold time 5 min)
Carrier gas: Hydrogen
Separating columns: Agilent Innowax: length 50 m, film thickness 0.2 μm, diameter 0.2 mm, pressure 1.0 bar
HP-1, length 50 m, film thickness 0.33 μm, diameter 0.2 mm, pressure 1.3 bar
Injector temperature: 250° C. (lower if required)
Injection volume: 0.3 μL (manual injection 0.3-0.6 μL)
Detector: flame ionization detector
Detector temperature: 275° C.
Split flow: 15 mL/minute The amines are identified by retention times on the polar and nonpolar column (see comparative chromatograms). For unknown components, a GC/MS analysis has to be conducted.

The amines detected and the internal standard are weighed accurately to 0.1 mg in accordance with the approximate ratios in the sample on an analytical balance. The concentration of the amines in the overall calibration solution was to correspond to that of the amines in the sample prepared (the concentrations of the amines are calculated by the GC analyzer program). Subsequently, the calibration solution is analyzed under the same conditions as the sample and the substance-specific correction factors are ascertained.

The amine contents of the sample are calculated with the aid of the GC analyzer program by the ISTD % method.
Epoxy Equivalent Weight The determination was effected to DIN EN ISO 3001.
Solids Content (Nonvolatile Component)

Unless stated otherwise, the solids content (also called proportion of solids, solid-state content, proportion of nonvolatiles) was determined to DIN EN ISO 3251 at 130° C.; 60 min, starting weight 1.0 g.
Proportion of Polymeric Organic Amines (Polyamines) in Aqueous Dispersions The determination was effected analogously to the determination of the solids content, except that the sample was kept at 130° C. for 8 hours (rather than 60 min). In this way, it is assured that the proportion of any nonvolatile monomeric amines (M) remaining is negligibly small and the measurement result corresponds to the parameter assigned to the result.
Proportion of Resin Mixture (I) or Resin Component in an Aqueous Dispersion The proportion is found from the sum total of the proportion of monomeric amines and the proportion of polyamines in aqueous dispersions.
Proportion of Monomeric Amines or Polyamines in the Resin Mixture (I) or the Resin Component (R)

The proportion of monomeric amines in the resin mixture (I) or of the resin component (R) is found from the proportion of monomeric amines in an aqueous dispersion divided by the sum total of the proportion of monomeric amines and the proportion of polyamines in this aqueous dispersion. The proportion of the polyamines is determined in a corresponding manner.
N—H Equivalent The N—H equivalent of the resin component (R) and of the resin mixture (I) are determined in the consecutive manner which follows.
a)
First of all, the N—H equivalent of the resin mixture (I) present in aqueous dispersion is determined. For this purpose, first of all, the different proportions by mass of primary and secondary amino groups (each as % nitrogen) in the aqueous dispersion is determined to DIN EN ISO 9702 (October 1998) by the method for aliphatic amines. The proportions by mass obtained are then used to obtain the molar amount of N—H functions in 100 g of the aqueous dispersion by the following calculation:

n(N—H)=(m(N from primary amino groups)/(14 g/mol))*2+m(N from secondary amino groups)/(14 g/mol) (where "m" represents the proportion by mass measured in each case).

The molar amount of N—H functions and the mass of sample (100 g) ultimately lead to the N—H equivalent of the sample (aqueous dispersion), i.e. the mass of the sample in which there is 1 mol of N—H functions.

Via the determination of the proportion of the resin mixture of the sample, the N—H equivalent of the resin mixture (I) can then be calculated:

(N—H equivalent(resin mixture (I))=N—H equivalent(sample)*proportion(resin mixture in sample))

The proportion of the resin mixture in the sample is found as the sum total of proportion of the polyamine and the proportion of monomeric amines (see above).

b)

The N—H equivalent of the resin component (R) is then calculated from the previously determined N—H equivalent of the resin mixture (I), the mass of the resin mixture (I) used in stage (B), the mass of component (IIb) used in stage (II), and the molar amount of epoxy groups used in component (IIb) (determined via the mass of component (b) used and the epoxy equivalent weight). This assumes a quantitative reaction of the epoxy groups with the N—H functions. The total mass of resin component (R) is obtained by addition of the mass of resin mixture (I) used and the mass of component (IIb) used.

Inventive Aqueous Dispersions (AD) and Dispersion c(AD)
Aqueous Dispersion (AD1)

683.00 g of Beckopox VEH 2849W (aqueous dispersion of a resin mixture (I), where the resin mixture contains 27.5% by weight of monomeric amines (isophoronediamine and xylylenediamine) and 72.5% by weight of polyamine and additionally has an NH equivalent of 108 g/mol) and 1663.77 g of demineralized water are combined in a reaction vessel, stirred continuously and kept at 95° C. for 1 hour. Subsequently, the mixture is cooled to 70° C. and a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in continuously while stirring over a period of 4 hours, and the mixture is kept at 70° C. for a further 1 hour. The reaction product thus obtained is cooled down to 45° C. The viscosity of the product is 150-250 mPas at 25° C.

In a subsequent process step, the process solvents isobutanol and methyl ethyl ketone are removed from the product by distillation under reduced pressure. The resulting aqueous dispersion (AD1) has a residual content of isobutanol and methyl ethyl ketone of <0.5% (gas chromatography).

The content of resin component (R) in the aqueous dispersion is 33.4% by weight (2.4% by weight of monomeric amine, 31% of polyamine). The resin component thus has a content of 7.2% by weight of monomeric amine (M). The resin component additionally has an amine equivalent weight (N—H equivalent weight) of 171 g/mol.

Aqueous Dispersion (AD2)

683.00 g of Beckopox VEH 2849W (aqueous dispersion of a resin mixture (I), where the resin mixture contains 27.5% by weight of monomeric amines (isophoronediamine and xylylenediamine) and 72.5% by weight of polyamine and additionally has an NH equivalent of 108 g/mol), 266.11 g of methyl ethyl ketone and 1395.96 g of (demineralized) water are combined in a reaction vessel, stirred continuously and kept at 70° C. for 1 hour. Subsequently, a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in continuously while stirring over a period of 4 hours, and the mixture is kept at 70° C. for a further 1 hour. The reaction product thus obtained is cooled down to 45° C. The viscosity of the product is 150-250 mPas at 25° C.

In a subsequent process step, the process solvents isobutanol and methyl ethyl ketone are removed from the product by distillation under reduced pressure. The resulting aqueous dispersion (AD2) has a residual content of isobutanol and methyl ethyl ketone of <0.5% (gas chromatography).

The content of resin component (R) in the aqueous dispersion is 33% by weight (2.4% by weight of monomeric amine, 31% of polyamine). The resin component thus has a content of 7.2% by weight of monomeric amine (M). The resin component additionally has an amine equivalent weight (N—H equivalent weight) of 171 g/mol.

Aqueous Dispersion (AD3)
Stage (A)

1000 g of polyalkylene polyether monoamine based on propylene oxide/ethylene oxide having an average molecular weight of 2000 g/mol (Jeffamine M2070, a primary amine function (=2 NH functions)) and 448.8 g of bisphenol A diglycidyl ether-based epoxy resin having an average epoxy equivalent weight of 186.5 g/mol are mixed in a reaction vessel and then the internal temperature is kept at 130° C. for 1 hour and at 80-90° C. for a further 2 hours. The product thus obtained has an epoxy equivalent weight of 1035 g/mol. The viscosity of the product is 6734 mPas at 23° C.

96.43 g of the reaction product thus obtained are mixed in a reaction vessel with 33.9 g of isophoronediamine and 27.12 g of m-xylylenediamine, then the internal temperature is kept at 60° C. for 1 hour and at 80-90° C. for a further 2 hours. After cooling to 50° C., it is diluted with water (solids content 80%). The resin mixture (I) present in the dispersion has an amine equivalent weight (N—H equivalent weight) of 105 g/mol. The viscosity of the product is 1540 mPas at 23° C.

Stage (B)

683.00 g of the reaction product from stage (A) and 1663.768 g of (demineralized) water are combined in a reaction vessel, stirred continuously and kept at 95° C. for 1 hour. Subsequently, the mixture is cooled to 70° C. and a mixture of 163.44 g of bisphenol A diglycidyl ether-based epoxy resin having an average epoxy equivalent weight of 186.5 g/mol, 39.46 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in continuously while stirring over a period of 4 h, and the mixture is kept at about 70° C. for a further 1 hour. The reaction product thus obtained is cooled down to 45° C. The viscosity of the product is 150-250 mPas at 25° C.

In a subsequent process step, the process solvents isobutanol and methyl ethyl ketone are removed from the product by distillation under reduced pressure. The resulting aqueous dispersion (AD3) has a residual content of isobutanol and methyl ethyl ketone of <0.5% (gas chromatography). The resin component has an amine equivalent weight (N—H equivalent weight) of 177 g/mol.

c(AD2)

1200 g (1.2 mol or 2.4 OH equivalents) of polyalkylene polyether based on ethylene oxide having an average molecular weight of 1200 g/mol and 1984.62 g (10.67 epoxy equivalents) of bisphenol A diglycidyl ether-based epoxy resin having an average epoxy equivalent weight of 186.5 g/mol are mixed in a reaction vessel and then the internal temperature is increased to 120-130° C. with continuous stirring. Subsequently, 6.5 g of Anchor 1040 (BF3-monoethylamine catalyst) are added and the temperature is increased further to 160° C. and kept at 160° C. for a further 4 h until the epoxy equivalent weight reaches 417 g/mol. This is followed by cooling to 55° C. and adding of 82.549 g of di-n-propylamine. Stirring is continued at 55° C. until the EEW reaches 482 g/mol. This is followed by heating to 60° C. and adding of a further 174.11 g of (demineralized) water. 1605.22 g of isophoronediamine (corresponding to 9.4 mol or 37.77 NH equivalents) and 575.96 g of m-xylylenediamine (corresponding to 4.2 mol or 16.91 NH equivalents) are mixed in a reactor and heated to an internal temperature of 60° C. Subsequently, over a period of 30 min, 3447.78 g of the above reaction product are added with continuous mixing. This increases the internal temperature to about 75° C., and stirring is continued at this temperature for 90 min. Thereafter, n-butyl glycidyl ether is added with stirring over the course of 20 min. This increases the internal temperature to about 80° C., and stirring is continued at this temperature for 60 min. Thereafter, a further 1374 g of (demineralized) water are added and this cools the product to 40° C.

The resin mixture present in the reaction mixture has an amine equivalent weight (N—H equivalent weight) of 125 g/mol.

c(AD3)

897.41 g of c(AD2) and 1868.00 g of demineralized water are heated to 95° C. in a reactor while stirring. This is followed by cooling to 70° C., and a mixture of 163.44 g (0.437 mol) of bisphenol A diglycidyl ether-based epoxy resin having an average epoxy equivalent weight of 186.5 g/mol, 39.46 g 44 g of polyalkylene polyether epoxide based on polypropylene oxide having an average epoxy equivalent weight of 395 g/mol, 81.96 g of ethoxypropanol; 81.47 g of methyl ethyl ketone and 81.72 g of isobutanol is metered in over a period of 2 hours, and the mixture is kept at about 70° C. for a further 1 hour.

The reaction product thus obtained is cooled down to 45° C. The viscosity of the product is 150-500 mPas at 25° C.

In a subsequent process step, the process solvents isobutanol and methyl ethyl ketone are removed from the product by distillation under reduced pressure. The resulting aqueous dispersion has a residual content of isobutanol and methyl ethyl ketone of <0.5%.

The resin mixture present in the dispersion has an amine equivalent weight (N—H equivalent weight) of 203 g/mol.

c(AD6)

Dispersion c(AD6) was produced analogously to stage (A) of dispersion (AD3), except using exclusively m-xylylenediamine rather than a mixture of isophoronediamine and m-xylylenediamine. The proportion of m-xylylenediamine was correspondingly increased in order to ensure that the same molar amount of monomeric amine was used.

The resin mixture present in the dispersion has an amine equivalent weight (N—H equivalent weight) of 100 g/mol.

Table A gives another overview of the aqueous dispersions produced. Additionally listed are commercially purchased further dispersions that are used as additional comparative dispersions c(AD) in aqueous coating compositions (see below).

TABLE A

| Aqueous dispersions | |
|---|---|
| (AD1) | See synthesis above |
| (AD2) | See synthesis above |
| (AD3) | See synthesis above |
| c(AD1) | Beckopox VEH 2849W |
| c(AD2) | See synthesis above |
| c(AD3) | See synthesis above |
| c(AD4) | Beckopox EH 613 (N—H equivalent (resin) = 116 g/mol) |
| c(AD5) | Beckopox EH 623w (N—H equivalent (resin) = 160 g/mol), contains acrylonitrile in the amine component |
| c(AD6) | See synthesis above |

Inventive Coating Compositions and Comparative Coating Compositions

Different inventive and comparative coating compositions were produced by the general production method that follows.

The paint base component (1) and curing component (2) of a coating composition were produced by combining the respective constituents and intimate mixing in a dissolver and optionally a bead mill. The constituents and their amounts can be found in tables B and C below.

For production of the coating compositions as such, the paint base components were each mixed with the curing components and optionally further water. The compositions were used as described below within one hour after completion, i.e. applied to a substrate and subsequently cured.

TABLE B

Coating compositions with paint base components comprising aqueous dispersions (AD) and c(AD)

| Constituent | I1 Parts by wt. | I2 Parts by wt. | C1 Parts by wt. | I3 Parts by wt. | C2 Parts by wt. | C3 Parts by wt. | C4 Parts by wt. |
|---|---|---|---|---|---|---|---|
| Paint base components | | | | | | | |
| (AD2) | 42.75 | 48.80 | | 47.00 | | | 48.8 |
| c(AD1) | | | 50.00 | | | | |
| c(AD5) | | | | | 16.80 | | |

TABLE B-continued

Coating compositions with paint base components comprising aqueous dispersions (AD) and c(AD)

| | | | | | | | |
|---|---|---|---|---|---|---|---|
| c(AD4) | | | | | | 16.00 | |
| Disperbyk 2012 | 1.00 | | | | | | |
| Disperbyk 199 | | 1.00 | 1.00 | 1.50 | 1.50 | 1.50 | 1.0 |
| AEROSIL R 972 | 1.00 | | | | | | |
| BYK 011, 29% | | 0.30 | 0.30 | 0.60 | 0.60 | 0.60 | 0.3 |
| BYK-023, 18% | 0.25 | | | | | | |
| TR81 RUTILE TITANIUM | 13.20 | 13.30 | 13.30 | 13.20 | 12.00 | 12.00 | 13.3 |
| SILFIT Z 91 | | 7.90 | 7.90 | | | | 7.7 |
| FINNTALC M 30 TALC | 9.50 | | | | | | |
| MICRO TALC IT EXTRA | | 7.10 | 7.00 | 9.50 | 8.00 | 8.00 | 7.1 |
| ASP 600 ALUMINUM SILICATE | 14.60 | 7.50 | 7.60 | 14.60 | 11.00 | 11.00 | 7.6 |
| LF BOWSEI MP-620 | 1.50 | 1.50 | 1.50 | 1.50 | 1.50 | 1.50 | 1.5 |
| BLANC FIXE N | 7.60 | 4.00 | 4.00 | 7.60 | 7.00 | 7.00 | 4.0 |
| NOVACITE L-207 A | | 2.00 | 2.00 | | | | 2.0 |
| BYK - 346 | 1.00 | | | | | | |
| BYK-348 | | 0.10 | 0.10 | 0.10 | 0.10 | 0.10 | 0.1 |
| Halox 570 | | 0.50 | 0.50 | 0.50 | 0.50 | 0.50 | 0.5 |
| Water | 7.60 | 6.00 | 9.80 | 3.90 | 41.00 | 41.80 | 6.0 |
| Total | 100 | 100 | 105 | 100 | 100 | 100 | 100 |
| Curing components | | | | | | | |
| Epoxy resin (100%) with an EEW of 185 g/mol | 14.04 | 15.91 | 27.38 | 16.38 | 14.4 | 21.8 | |
| BUTYL ACETATE 98-100% | 9.16 | | | | | | |
| METHYL ISOAMYL KETONE (MIAK) | | 2.72 | 4.68 | 2.8 | 2.5 | 3.7 | |
| BUTYLGLYCOL ACETATE | | 7.66 | 13.17 | 7.882 | 6.9 | 10.5 | |
| SILQUEST A-187 | 0.80 | 0.91 | 1.57 | 0.94 | 0.8 | 1.2 | |
| Epoxy resin (100%) with an EEW of 450 g/mol | | | | | | | 67.7 |
| Water, demin. | | | | | | | 26.3 |
| Total curing agents | 24.00 | 27.20 | 46.80 | 28 | 24.6 | 37.3 | 94.0 |

| Added water | I1 Parts by wt. | I2 Parts by wt. | C1 Parts by wt. | I3 Parts by wt. | C2 Parts by wt. | C3 Parts by wt. | C4 Parts by wt. |
|---|---|---|---|---|---|---|---|
| Water | 15.5 | 12.0 | 16.0 | 17.0 | 6.5 | 13.0 | 0.0 |

| Indices | I1 | I2 | C1 | I3 | C2 | C3 | C4 |
|---|---|---|---|---|---|---|---|
| Pigment to binder ratio (P/B) | 1.6 | 1.4 | 1.0 | 1.4 | 1.4 | 1.1 | 0.8 |
| DIN4 flow time occurrence in s | 19 | 20 | 20 | 20 | 20 | 20 | 23 |

TABLE C

Coating compositions with paint base components comprising epoxy resins

| Constituent | I4 Parts by wt. | I5 Parts by wt. | C5 Parts by wt. | C6 Parts by wt. | I6 Parts by wt. | C7 Parts by wt. | C8 Parts by wt. |
|---|---|---|---|---|---|---|---|
| Paint base components | | | | | | | |
| Epoxy resin (100%) with an EEW of 198 g/mol | 33.20 | 33.20 | 33.20 | 33.20 | 33.20 | 33.20 | 33.20 |
| Water | 15.00 | 15.00 | 15.00 | 15.00 | 15.00 | 15.00 | 15.00 |
| Disperbyk 199 | 2.00 | 2.00 | 2.00 | 2.00 | 2.00 | 2.00 | 2.00 |
| BYK 011, 29% | 0.30 | 0.30 | 0.30 | 0.30 | 0.30 | 0.30 | 0.30 |
| TR81 RUTILE TITANIUM | 12.90 | 12.90 | 12.90 | 12.90 | 12.90 | 12.90 | 12.90 |
| MICRO TALC IT EXTRA | 12.50 | 12.50 | 12.50 | 12.50 | 12.50 | 12.50 | 12.50 |
| ASP 600 ALUMINUM SILICATE | 9.80 | 9.80 | 9.80 | 9.80 | 9.80 | 9.80 | 9.80 |
| BLANC FIXE N | 4.40 | 4.40 | 4.40 | 4.40 | 4.40 | 4.40 | 4.40 |

TABLE C-continued

Coating compositions with paint base components comprising epoxy resins

| | | | | | | | |
|---|---|---|---|---|---|---|---|
| LF BOWSEI MP-620 | 1.50 | 1.50 | 1.50 | 1.50 | 1.50 | 1.50 | 1.50 |
| NOVACITE L-207 A | 2.00 | 2.00 | 2.00 | 2.00 | 2.00 | 2.00 | 2.00 |
| Water | 5.00 | 5.00 | 5.00 | 5.00 | 5.00 | 5.00 | 5.00 |
| BYK 333 | 0.50 | 0.50 | 0.50 | 0.50 | 0.50 | 0.50 | 0.50 |
| Water | 0.90 | 0.90 | 0.90 | 0.90 | 0.90 | 0.90 | 0.90 |
| Total | 100 | 100 | 105 | 100 | 100 | 100 | 100 |
| Curing components | | | | | | | |
| (AD1) | 54.81 | | | | | | |
| (AD2) | | 56.81 | | | | | |
| (AD3) | | | | | 65.38 | | |
| c(AD6) | | | 31.35 | | | | |
| c(AD1) | | | | 33.09 | | | |
| c(AD2) | | | | | | 19.31 | |
| c(AD3) | | | | | | | 62.81 |
| BUTYLGLYCOL | 1.22 | 1.21 | 0.69 | 0.72 | 1.21 | 0.95 | 1.58 |
| Halox 570 | 0.60 | 0.61 | 0.34 | 0.36 | 0.61 | 0.47 | 0.79 |
| Water | 4.26 | 1.97 | 1.92 | 2.03 | | 26.67 | 13.83 |
| Total curing agents | 60.9 | 60.6 | 34.3 | 36.2 | 67.2 | 47.4 | 79.0 |

| Added water | I4 Parts by wt. | I5 Parts by wt. | C5 Parts by wt. | C6 Parts by wt. | I6 Parts by wt. | C7 Parts by wt. | C8 Parts by wt. |
|---|---|---|---|---|---|---|---|
| Water | 0 | 0 | 11 | 5 | 0 | 2 | 0 |

| Indices | I4 | I5 | C5 | C6 | I6 | C7 | C8 |
|---|---|---|---|---|---|---|---|
| Pigment to binder ratio (P/B) | 1.1 | 1.1 | 1.4 | 1.4 | 1.1 | 1.2 | 1.0 |
| DIN4 flow time occurrence in s | 24 | 24 | 24 | 24 | 26 | 24 | 16 |

Production of Coatings Using the Coating Compositions

Sandability

To test the suitability of the coating compositions as primer-surfacers or for ascertaining sanding characteristics, coatings were produced by the production method that follows and then examined for their sandability.

Substrates used were steel plates (60 cm×50 cm). These were pretreated/cleaned as follows: cleaning with 360-4 Glasurit metal cleaner, sanding with P80 from Mirka, gold type, cleaning again to remove sanding dust with 360-4 Glasurit. Venting for 15 min.

The coating compositions were stirred up and painted onto the substrate in a thin, continuous spraying operation with a standard painting gun (for example SATA 100 B F 1.6 mm RP, at 2.0 bar), flashed off for 5 min, painted in a further full spraying operation, flashed off for 10 min and then cured at a temperature of 60° C. in an oven or at room temperature for 14 to 16 hours for different periods of time (35 to 60 min). The layer thickness was in each case between 60 and 80 micrometers (Dualscope MP40, ED10 probe from Fischer).

After the curing, the coatings or coated substrates were stored at 20° C. for 20 min and then examined for performance properties.

For this purpose, 09560 black control powder (from 3M) was applied to the coated surface and sanded dry by Excenter (FESTOOL LEX3), 5 mm strokes, and sandpaper from RODIM, Standard P400 type, until the black control powder had been completely removed.

Sandability was assessed as follows:

Assessment of Sandability:

Assessment of the Sandpaper:

0—> no clogging (very good sandability)

1—> minimal clogging (sandability still acceptable)

2—> clogging, formation of small "nodules" (poor sandability)

3—> severe clogging, formation of "nodules" (spacers) (very poor sandability)

The clogging of the coating material on the sandpaper is very readily identifiable via the use of the black control powder. No clogging means that the material sanded off is obtained as fine dust and hence does not clog the sandpaper and does not lead to residues that are difficult to remove on the coating surface.

The results are shown in tables D and E. The letter "B" before the respective coating composition indicates that the coating is a cured coating.

TABLE D

Sanding results

| | CI1 | CI2 | CC1 | CI3 | CC2 | CC3 | CC4 |
|---|---|---|---|---|---|---|---|
| Drying time in min | 35 | 35 | 35 | 40 | 40 | 40 | 40 |
| Drying temperature in ° C. | 60 | 60 | 60 | 60 | 60 | 60 | 60 |
| Sanding result | 0 | 1 | 3 | 0 | 3 | 2 | 3 |

The results show that the coatings of the invention (produced from the coating compositions of the invention) have distinctly improved sandability. Particularly the comparison of the systems of the invention with the CC1 system shows that the epoxy postmodification of the Beckopox VEH 2849 commercial product and the associated increase in N—H equivalent (and hence also in the molecular weight) leads to a distinct improvement in sandability. The use of the Beckopox EH 613 commercial product (c(AD4)) having too low an N—H equivalent does not lead to satisfactory results in sandability either (CC3). The same applies to the use of Beckopox EH 623w (c(AD5)), which contains acrylonitrile in the amine component. It is not least shown by the CC4 system that the use of an epoxy resin having too high an epoxy equivalent of 450 g/mol leads to poor sandability.

TABLE E

Sanding results:

| | I4 | I5 | C5 | C6 | I6 | C7 | C8 |
|---|---|---|---|---|---|---|---|
| Drying time in min | 40 | 40 | 40 | 40 | 40 | 40 | 40 |
| Drying temperature in ° C. | 60 | 60 | 60 | 60 | 60 | 60 | 60 |
| Sanding result | 0 | 0 | 3 | 3 | 3 | 3 | 3 |
| Drying time in min | 50 | 50 | 50 | 50 | 50 | 50 | 50 |
| Drying temperature in ° C. | 60 | 60 | 60 | 60 | 60 | 60 | 60 |
| Sanding result | | | 3 | 2 | 1 | 3 | 3 |
| Drying time in min | 60 | 60 | 60 | 60 | 60 | 60 | 60 |
| Drying temperature in ° C. | 60 | 60 | 60 | 60 | 60 | 60 | 60 |
| Sanding result | | | 3 | 0 | 0 | | |

Again, the results show clearly that the systems of the invention lead to improved sandability. While systems I4 and I5 already have optimal sandability in the case of a drying time of just 40 min, the system 16 is acceptably sandable at least in the case of a drying time of 50 min. All comparative systems, in absolute terms, are inadequately or poorly sandable in the case of a drying time of 50 min.

Further Studies

Moreover, using the coating compositions, multicoat paint systems were also produced (using standard basecoat and clearcoat materials), and, in addition, previously produced multicoat paint systems that had defects were also repaired using the coating compositions as primer-surfacer. In the latter case, the coating compositions were applied to a multicoat paint system that had defects disposed on a metallic substrate in the regions of the defects, cured and sanded. This was followed by the application of basecoat and clearcoat. The systems of the invention led to excellent adhesion of the overall structure and hence have optimal usability.

The invention claimed is:

1. An aqueous resin dispersion (AD) comprising a resin component (R) comprising at least one di- and/or polyfunctional monomeric primary and/or secondary amine (M) and polyfunctional polymeric organic amines having primary and/or secondary amino groups,
   wherein the resin component (R) has an NH equivalent of 150 to 400 g/mol and a proportion by weight of the at least one di- and/or polyfunctional monomeric organic amine (M) of 5% to 15% by weight in the aqueous resin dispersion (AD), wherein the at least one di- and/or polyfunctional monomeric organic amine (M) is unreacted in the aqueous resin dispersion (AD);
   wherein the polyfunctional polymeric organic amines having primary and secondary amino groups also comprise, in interreacted form,
      (i) at least one di- and/or multifunctional organic epoxy compound, wherein the epoxy compounds have an average epoxy equivalent weight of less than 400 g/mol,
      (ii) at least one monomeric amine (M), and
      (iii) at least one compound X—R wherein X is a functional group reactive toward epoxy groups and R is an organic radical containing polyoxyalkylene units and not containing any further X groups,
   and wherein the at least one monomeric amine (M) consists to an extent of at least 65 mol % of amines consisting of amino groups and hydrocarbon units.

2. The aqueous resin dispersion (AD) as claimed in claim 1, wherein the at least one monomeric amine (M) is a difunctional primary and/or secondary amine.

3. The aqueous resin dispersion (AD) as claimed in claim 1, wherein the resin component (R) has an N—H equivalent of 170 to 250 g/mol.

4. The aqueous resin dispersion (AD) as claimed in claim 1, wherein the X group in the compound (iii) is a primary amino group.

5. The aqueous resin dispersion (AD) as claimed in claim 1, wherein the compound (iii) is a primary polyoxyalkylenemonoamine.

6. The aqueous resin dispersion (AD) as claimed in claim 1, wherein the at least one di- and/or multifunctional organic epoxy compound of component (i) has an average epoxy equivalent weight of less than 250 g/mol.

7. The aqueous resin dispersion (AD) as claimed in claim 1, wherein the polymeric organic amines consist of components (i), (ii) and (iii).

8. The aqueous resin dispersion (AD) as claimed in claim 1, wherein the resin component (R) consists of the at least one di- and/or polyfunctional monomeric primary and/or secondary amine (M) and the polyfunctional polymeric organic amines having primary and/or secondary amino groups.

9. The aqueous resin dispersion (AD) as claimed in claim 1, wherein the at least one monomeric amine (M) consists to an extent of at least 75 mol % of amines consisting of amino groups and hydrocarbon units.

10. An aqueous two-component coating composition comprising a paint base component (1) and a curing component (2), wherein
   I) the paint base component (1) comprises at least one aqueous dispersion as claimed in claim 1 and the curing component (2) comprises at least one epoxy resin, wherein the epoxy resins have an average epoxy equivalent weight of less than 400 g/mol,
   or
   II) the paint base component (1) comprises at least one epoxy resin, where the epoxy resins have an average epoxy equivalent weight of less than 400 g/mol, and the curing component (2) comprises the at least one aqueous dispersion.

11. The coating composition as claimed in claim 10, characterized in that it is a surfacer or primer-surfacer.

12. A process for producing a cured coating on a substrate, the process comprising applying a coating composition as claimed in claim 10 to the substrate and then curing the composition.

13. A process for repairing a multicoat paint system having defects, comprising applying a coating composition as claimed in claim 10 in the region of the defects, curing the composition to produce a cured coating layer and then sanding the cured coating layer.

14. A coating that has been produced by a process as claimed in claim 12.

15. The aqueous resin dispersion (AD) as claimed in claim 1, wherein the at least one monomeric amine (M) is a difunctional primary amine.

16. The aqueous resin dispersion (AD) as claimed in claim 1, wherein the at least one monomeric amine (M) consists to an extent of at least 90 mol % of amines consisting of amino groups and hydrocarbon units.

17. The aqueous resin dispersion (AD) as claimed in claim 1, wherein the at least one monomeric amine (M) consists to an extent of 100 mol % of amines consisting of amino groups and hydrocarbon units.

* * * * *